(12) United States Patent
Goto et al.

(10) Patent No.: US 7,758,213 B2
(45) Date of Patent: Jul. 20, 2010

(54) LIGHT SOURCE UNIT

(75) Inventors: Kazuhiro Goto, Himeji (JP); Manami Aoki, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/281,383

(22) Filed: Nov. 18, 2005

(65) Prior Publication Data

US 2006/0126333 A1    Jun. 15, 2006

(30) Foreign Application Priority Data

Dec. 14, 2004   (JP)   ............... 2004-361331

(51) Int. Cl.
*F21S 8/00* (2006.01)
(52) U.S. Cl. .............. 362/263; 362/659; 362/538; 313/318.11; 313/113
(58) Field of Classification Search .......... 362/659, 362/296, 263, 538; 313/318.11, 113
See application file for complete search history.

(56) References Cited

U.S. PATENT DOCUMENTS

| | | | | |
|---|---|---|---|---|
| 2,262,629 A | * | 11/1941 | Wright | 174/50.52 |
| 3,619,876 A | * | 11/1971 | Besacier | 445/23 |
| 3,700,881 A | * | 10/1972 | Slomski | 362/265 |
| 4,053,809 A | * | 10/1977 | Fridrich et al. | 313/594 |
| 4,654,557 A | * | 3/1987 | Haraden | 313/318.03 |
| 5,144,190 A | * | 9/1992 | Thomas et al. | 313/113 |
| 5,144,201 A | * | 9/1992 | Graham et al. | 313/634 |
| 5,235,498 A | * | 8/1993 | Van Dulmen et al. | 362/549 |
| 5,506,464 A | * | 4/1996 | Ooms | 313/113 |
| 5,747,919 A | * | 5/1998 | Gandhi et al. | 313/318.01 |
| 5,789,850 A | | 8/1998 | Iwafuji et al. | |
| 6,002,197 A | | 12/1999 | Tanaka et al. | |
| 6,060,820 A | * | 5/2000 | Noll et al. | 313/113 |

(Continued)

FOREIGN PATENT DOCUMENTS

| | | |
|---|---|---|
| EP | 0 595 412 A1 | 5/1994 |
| EP | 0 762 459 A2 | 3/1997 |
| EP | 1 160 832 A2 | 12/2001 |
| EP | 1 312 856 A1 | 5/2003 |
| JP | 2003-7101 A | 1/2003 |

OTHER PUBLICATIONS www.yourdictionary.com/ahd/h/h0164500.html.*
www.yourdictionary.com/ahd/b/b0096400.html.*
www.yourdictionary.com/ahd/c/c0748700.html.*
www.yourdictionary.com/ahd/c/c0383600.html.*
European Search Report for Application No. EP 05 02 4926.

*Primary Examiner*—Sandra L O'Shea
*Assistant Examiner*—Danielle Allen
(74) *Attorney, Agent, or Firm*—David S. Safran; Roberts Mlotkowski Safra & Cole, P.C.

(57) ABSTRACT

A light source unit which has a concave reflector and a discharge lamp with bilateral hermetically sealing parts of which a first of the hermetically sealing parts is mounted in a base component that is mounted in an opening of a neck of the concave reflector. An outer lead proceeds directly from the first hermetically sealing part to the base component and is connected to it.

14 Claims, 6 Drawing Sheets

U.S. PATENT DOCUMENTS

| | | | |
|---|---|---|---|
| 6,505,958 B2 | 1/2003 | Ooms et al. | |
| 6,540,379 B2 * | 4/2003 | Ooms et al. | 362/263 |
| 6,559,600 B1 * | 5/2003 | Wada et al. | 313/634 |
| 6,653,782 B2 * | 11/2003 | Vallabhaneni et al. | 313/578 |
| 7,001,027 B2 * | 2/2006 | Fujisawa et al. | 353/98 |
| 2002/0024811 A1 * | 2/2002 | Horikawa | 362/264 |
| 2004/0207306 A1 * | 10/2004 | Horiuchi et al. | 313/113 |
| 2004/0212286 A1 * | 10/2004 | Horiuchi et al. | 313/113 |

* cited by examiner

LIGHT SOURCE UNIT

BACKGROUND OF THE INVENTION

1. Field of Invention

The invention relates to a light source unit which is used, for example, for a liquid crystal projector device in which a high pressure discharge lamp of the short arc type is used and which has a concave reflector.

2. Description of Related Art

For example, a light source unit is used as a light source of a liquid crystal projector device which comprises the following:

a light source lamp comprised of a discharge lamp such as, for example, an ultrahigh pressure mercury lamp, a metal halide lamp or the like; as well as a concave reflector which has a light projection opening on its front and projects the light emitted by the light source lamp forward with high efficiency.

FIG. 6 shows one example of a conventionally used light source unit (JP-A-2003-007101) in cross section. The light source unit 10' has a concave reflector 20' with a cylindrical neck 25'. A cylindrical base component 40' with an inside diameter which is matched to the outside diameter of this cylindrical neck 25' is attached by means of a cement 55' or the like to the back end of the cylindrical neck 25' in this concave reflector 20'. A discharge lamp 30 with bilateral sealed closures has a discharge vessel 31', opposite ends of which are each provided with a hermetically sealing part 33'A, 33'B. The lamp 30 also comprises an arc tube 32' in which there is a pair of opposed electrodes. The hermetically sealing part 33A' is provided with a base 45 which is attached in the base component 40'.

Recently, for a liquid crystal projector device, there has been a desire to make them even smaller. It is also required of a light source unit, which is used as an illumination light source, that it be made smaller in order to reduce the size of the receiving space for it. Specifically, the hermetically sealing part 33A' is mounted directly in the concave reflector 20' without a base by a means of a cement 55' or the like, by which a light source unit with a narrow, reduced reflector neck 25' arises. FIG. 7 shows one example of it (compare also Japanese Patent Publications JP-A-2003-523606 and JP-A-2003-523607, and U.S. Pat. Nos. 6,505,958 and 6,540,379). In this example, a line 60' which passes through the hermetically sealing part of the lamp is routed via a neck opening 25K of the concave reflector to the outside surface of the concave reflector and is connected to a contact component 91' which is located on the outside surface thereof. However, since a contact terminal S is arranged by a part of the concave reflector 20' provided with an opening 24', the area of the reflector surface which can actually be used is reduced and the function as light source unit is adversely affected. For example, the amount of reflected light flux is even reduced by 2% by a single contact terminal.

Furthermore, since the connection to the contact component 90' which is located in the concave reflector 20' takes place by means of the line 60'B from the outer lead 50'B via the opening 24', there are the disadvantages that the area to be insulated in the vicinity of the concave reflector 20' is increased and that the insulating distance which is to be ensured by applying a high voltage during starting is increased.

The reflection surface of the concave reflector is formed as a cold mirror which reflects light in the visible radiation range and transmits light in the UV range and the IR range. In the example, in FIG. 7, the coating of the electric line and the like are omitted. On the back of the concave reflector, however, generally, there is a line coated with silicone resin or the like in order to insulate the outer lead as far as the contact component. In a coated electric line on the back of the concave reflector there is, however, the disadvantage that, as a result of the uninterrupted irradiation of the light transmitted by the reflector in the UV range, for example, within a liquid crystal projector device the coating means and the like are subjected to degradation by UV radiation during use, that the components volatilizing from them adhere to the reflector and to the optical lenses in the vicinity and the like, and that the optical properties are damaged by them.

SUMMARY OF THE INVENTION

A primary object of the present invention is to devise a light source unit in which, without adverse effects on the effective reflection surface of the reflector, the light intensity of the lamp can be effectively used, in which the electrical insulating distance on the back of the reflector is minimized, in which it becomes difficult for the coated electric line located on the back of the concave reflector to be degraded by light in the UV range which was transmitted by the reflector, and in which the reflector unit can thus be made smaller.

According to a first aspect of the invention, in a light source unit which has a concave reflector and a discharge lamp with bilateral sealed closures and in which one of the hermetically sealing parts of this discharge lamp is mounted in a base component which is attached in an opening of the neck of the concave reflector, the aforementioned object is achieved in that an outer lead which proceeds directly from this hermetically sealing part or a feed line which is connected to this outer lead is connected to a terminal component which is held securely by the base component.

In another aspect of the invention, in a light source unit which has a concave reflector and a discharge lamp with bilateral sealed closures and in which one of the hermetically sealing parts of this discharge lamp is mounted in a base component which is attached in an opening of the neck of the concave reflector, the object is furthermore achieved in that an outer lead which proceeds directly from the hermetically sealing part, or a feed line which is connected to this outer lead is connected to the above described base component.

ACTION OF THE INVENTION

The invention can reduce the contact components which reduce the reflection surface of the concave reflector. The degree of light utilization of the light source unit is therefore kept high.

Furthermore, the electrical insulation area of the rear of the reflector can be reduced in size, and in the case of starting by applying a high voltage, the area which is required to ensure the creepage distance can be reduced, and thus, can contribute to making the device smaller. Additionally, the machining number of the hole of the reflector can be reduced, thus also the effort for the arrangement of the contact components, and in this way, the production costs can be decreased. However, since the coated electric line which is located on the back of the concave reflector can be shortened, it also becomes difficult for the coating material of the electric line to undergo UV degradation by the light in the UV range which has been transmitted by the reflector. Even if the coated electric line is subjected to tension, this tensile force is suppressed by the terminal component or a screw part in the terminal component, by which the feed line is not exposed to an unnecessary force and by which the projecting tip of the outer lead of the hermetically sealing part is not damaged.

The invention is further described below with reference to the several embodiments shown in the drawings.

DETAILED DESCRIPTION OF THE INVENTION

Figure 1A:
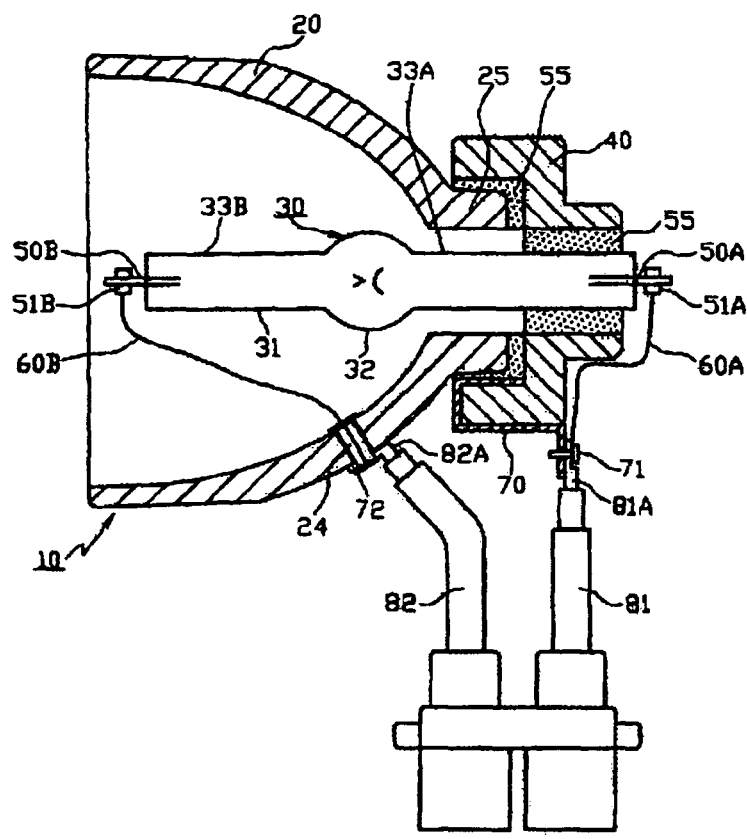
FIGS. 1(a) & 1(b) are a partial cross section and a perspective view, respectively, of one embodiment of a light source unit in accordance with the invention.

Embodiments of the invention are described below. In the representations mentioned below, components like electrodes, metal foils and the like in the discharge vessel of the discharge lamp are not shown. There are indeed cases in which, on the side of the front opening of the concave reflector of the optical unit, to reduce the IR radiation and as explosion protection, there is a front glass; however, such a front glass is not shown in the drawings.

Figure 1B:
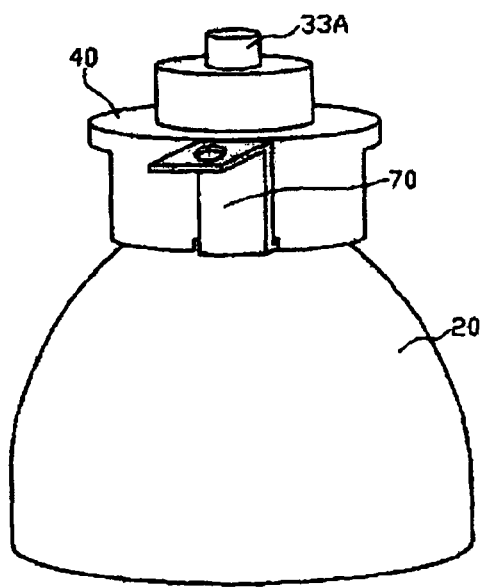

FIGS. 1(a) & 1(b) each show one example of the arrangement of a light source unit in accordance with the invention having a concave reflector 20 in which is mounted a discharge lamp 30 with bilateral sealed closures, a silica glass discharge vessel 31 with a light emitting part 32 and hermetically sealing parts 33A, 33B which extend from opposite ends of it. One hermetically sealing part 33A is inserted into the reflector neck 25 and is attached in the base component 40 by means of a cement 55. The base component 40 is attached in the reflector neck 25 by means of the cement 55. The discharge lamp 30 is an ultra-high pressure mercury lamp or a metal halide lamp. The outer leads 50A, 50B project directly outward from the hermetically sealing parts 33A, 33B respectively. There is no base. The outer lead 50B on the front of the reflector is connected by a connecting component 51B to a line 60B and is connected to a terminal 82A of a coated electric line 82 in an opening 24 of the concave reflector by using an eye component 72.

On the other hand, the outer lead 50A, which extends outward from the hermetically sealing part 33A, is connected by a connecting component 51A to a line 60A which is connected to a metallic terminal component 70 by means of a screw 71 and is connected to a terminal 81A. The terminal component 70 is bent according to the shape of the base component 40, is clamped by the base component 40 and the concave reflector 20, and is thus held securely. FIG. 1(b) is an external view of the light source unit 10 FIG. 1(a). Here, a state is shown in which the terminal component 70 is clamped and held by the base component 40, the outer leads, the line and the like not being shown. The base component 40 is resistant to thermal shock, is produced from a ceramic material with an electrical insulation function, and is in the state in which there is no electrical connection other than the lead.

By this arrangement, the number of the contact components on the reflector surface can be reduced and the degree of light utilization can be increased. Furthermore, the electrical insulation area of the rear of the reflector can be made smaller, and in the case of starting by application of a high voltage, also the area which is required to ensure the creepage distance can be reduced, and thus, can contribute to making the device smaller. Additionally, the number of the holes machined in the reflector can be reduced, thus also the effort for the arrangement of the contact components, and in this way, the production costs can be decreased. Still further, the coated electric line which is located on the back of the concave reflector can be shortened. Thus, the disadvantage due to degradation of the coating material of the electric line by UV radiation which ha been transmitted by the reflector can be suppressed.

Even in the case in which the coated electric line 81 is subject to tension, the tensile force is suppressed by the screw part 71 in the terminal component 70, by which the feed line 60A is not exposed to an unnecessary force and by which damage to the projecting tip of the outer lead 50A of the hermetically sealing part 33A is avoided.

The outer lead 50A can also be lengthened and bent and can be connected directly to the screw part 71.

Figure 2A:
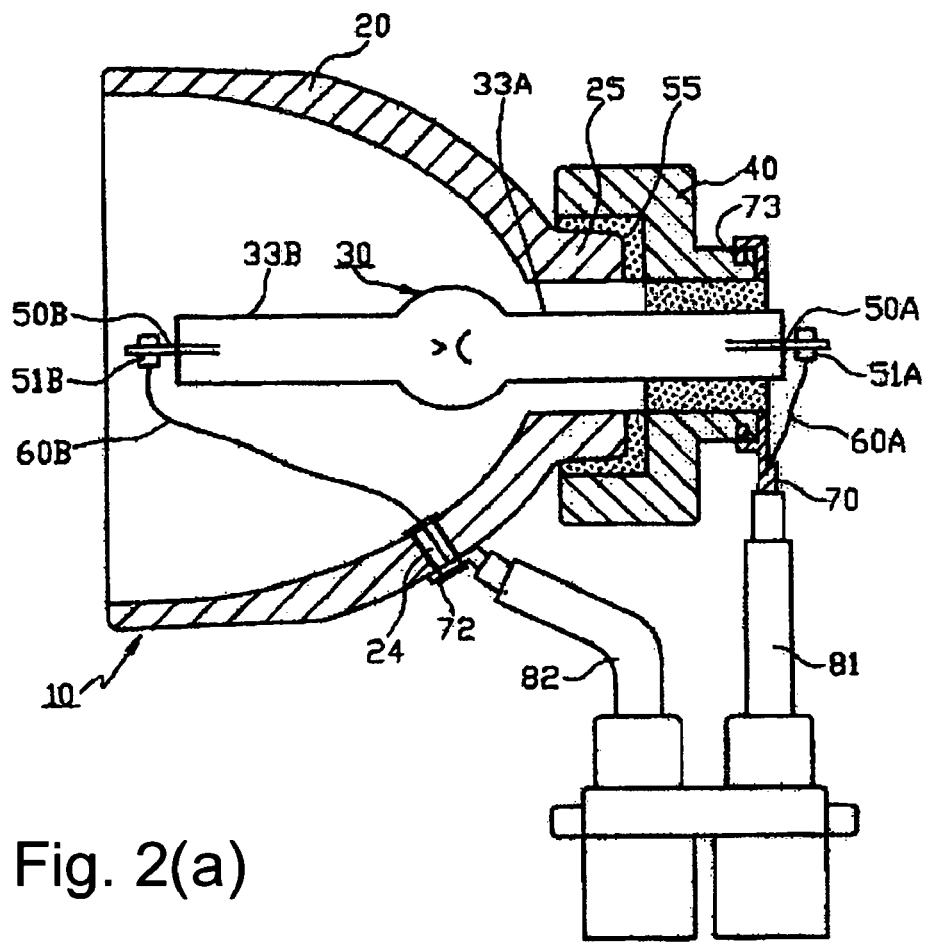
FIGS. 2(a) & 2(b) are a partial cross section and an end view, respectively, of another embodiment of a light source unit in accordance with the invention.
Figure 2B:
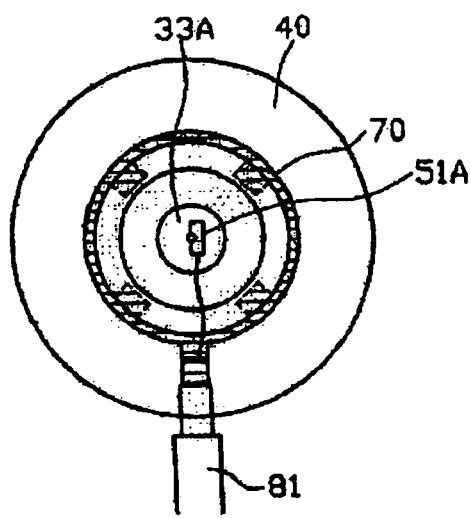

FIG. 2(a) is a modified version of arrangement shown in FIG. 1(a). Here, the terminal component 70 is annular and is held by a fold, which is provided in the ring of the annular terminal component 70, being installed in a groove 73 which is formed on the peripheral surface of the end area of the base component 40. The outer leads 50A, 50B are connected to feed lines 60A, 60B by connecting components 51A, 51B respectively. The feed line 60A is connected to the terminal component 70 by welding or the like. The feed line 60B is connected to one terminal 82A of a coated electric line 82 in an opening 24 of the concave reflector by using an eye component 72. FIG. 2(b) is a schematic of the entire base component as viewed from the rear of the light source unit. The folds which are installed in the groove of the terminal component 70 appear as tabs outlined using a broken line.

This arrangement can reduce the number of the arrangement of contact components on the reflector surface and can increase the degree of light utilization. Furthermore, the electrical insulation area of the rear of the reflector can be reduced, and in the case of starting by applying a high voltage, also the area which is required to ensure the creepage distance can be reduced, and thus, can contribute to making the device smaller. Additionally, the number of the holes machined in the reflector can be reduced, so that the effort to produce the arrangement of the contact components, and in this way, the production costs, can be decreased. Also, the coated electric line which is located on the back of the concave reflector can be shortened. Thus, the disadvantage of degradation of the coating material of the electric line due to the UV radiation which is transmitted by the reflector can be suppressed.

Even if the coated electric line 81 is subjected to tension, the tensile force is suppressed by the terminal component 70, by which the feed line 60A is not exposed to an unnecessary force and by which damage to the projecting tip of the outer lead 50A of the hermetically sealing part 33A is avoided.

The outer lead 50A can also be lengthened and bent, and can be connected directly to the screw part 71.

Figure 3:
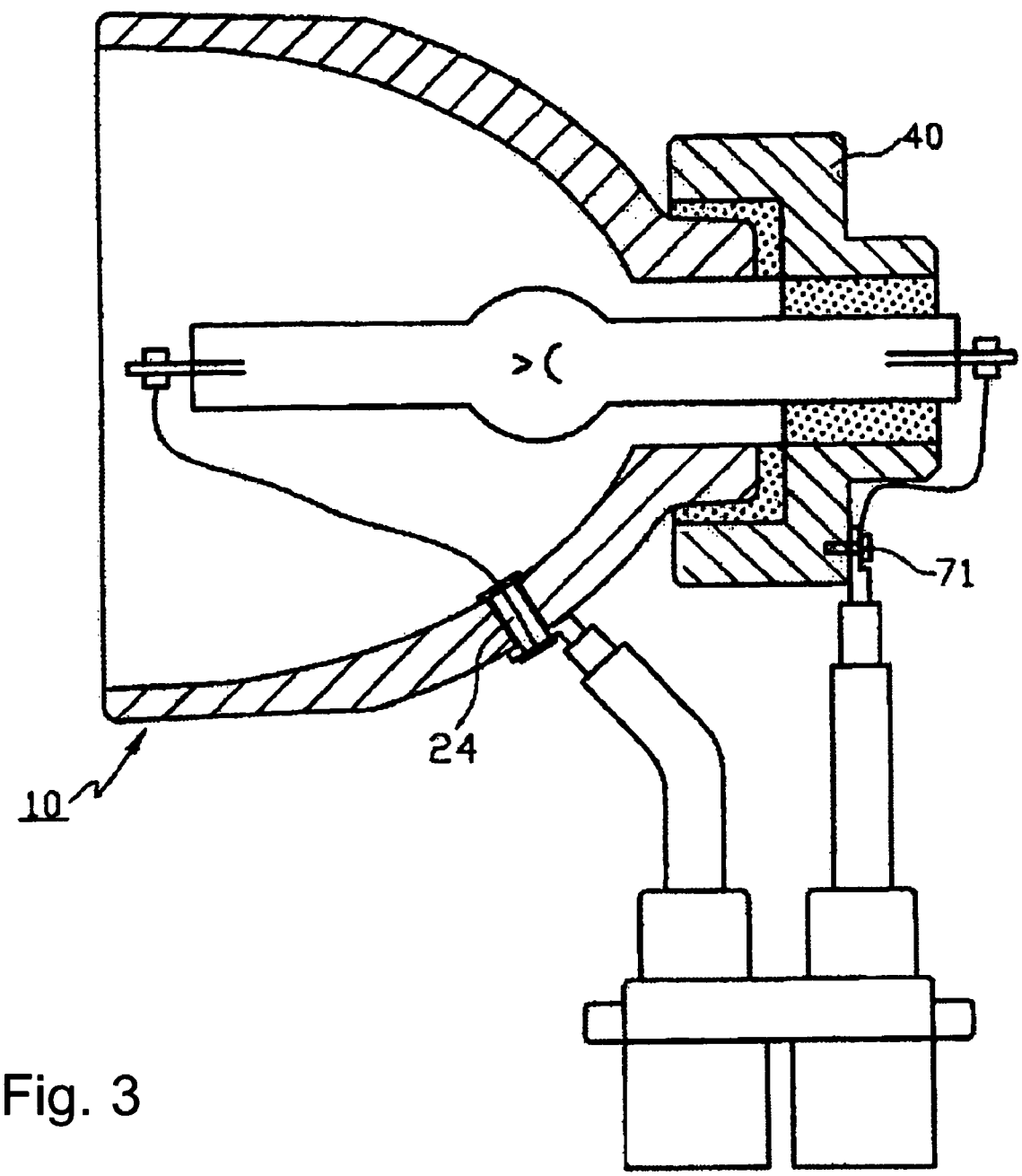
FIG. 3 is a partial cross section of still another embodiment of a light source unit in accordance with the invention.

FIG. 3 shows an example in which, without using a terminal component, a mounting screw 71 has been attached directly in the base component 40. In this case, it must be watched that no cracking of the ceramic base component occurs. However, it is possible to react thereto by monitoring the attachment torque strength of the screw to insure that it stays in a suitable range during mounting of the screw.

Figure 4:
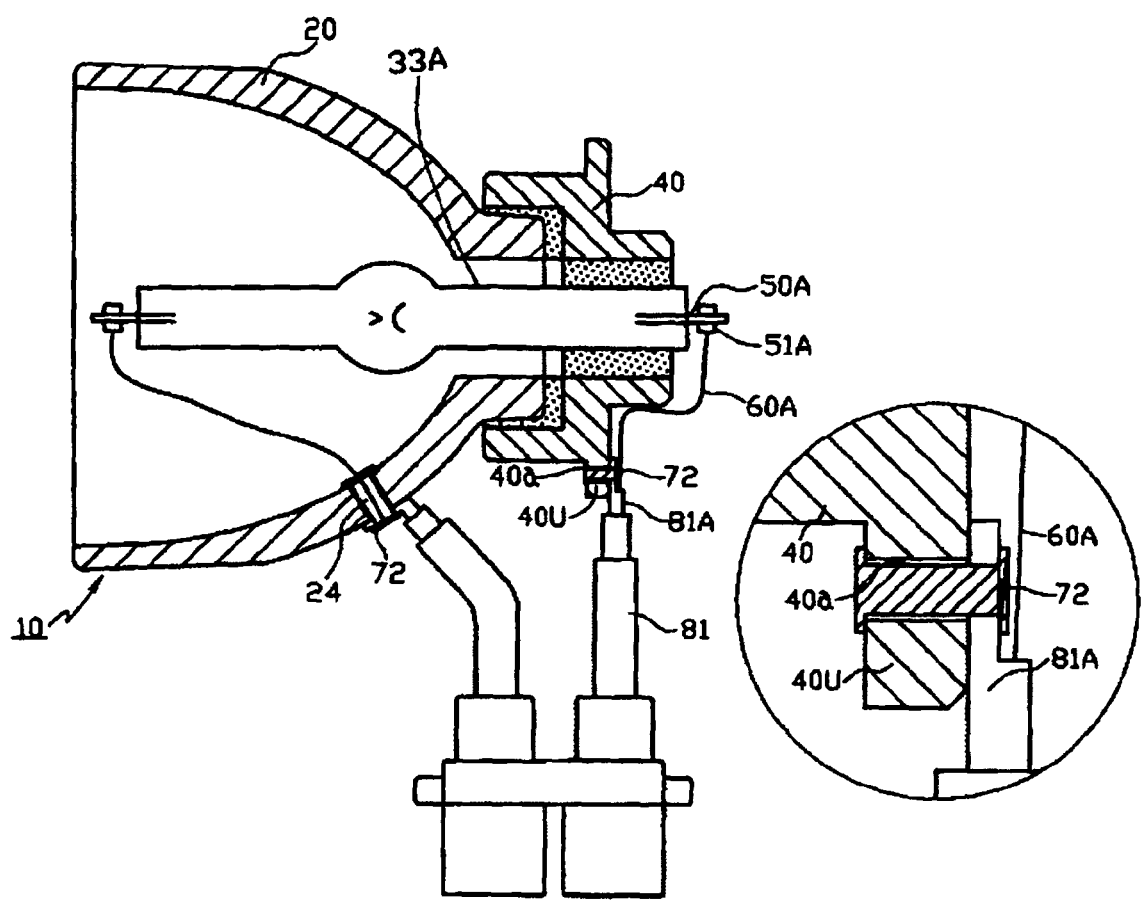
FIG. 4 is a partial cross section of still another embodiment of a light source unit in accordance with the invention along with an enlarged detail of the connection between the electric feed line and the base component.

FIG. 4 shows an example in which the base component 40 is provided with a thin flange part 40U which has a through opening 40a and in which the feed line 60A which is connected to the outer lead 50A is connected to the terminal 81A by means of an eye component 72 using this through opening 40a. The partial view in the circular frame is an enlargement of the vicinity of the through opening 40a.

This arrangement can reduce the number of the arrangement of contact components on the reflector surface and can increase the degree of light utilization. Furthermore, the electrical insulation area of the back of the reflector can be made smaller, and in the case of starting by applying a high voltage, also the area which is required to ensure the creepage distance can be reduced, and thus, can contribute to making the device smaller. Additionally, the number of the holes which must be made in the reflector can be reduced, thus reducing the effort for producing the arrangement of the contact components, and in this way, the production costs can be decreased. Still further, the coated electric line which is located on the back of the concave reflector can be shortened. Thus, the disadvantage as a result of degradation of the coating material of the electric line by the UV radiation which is transmitted by the reflector can be suppressed.

Even if the coated electric line 81 is subject to tension, the tensile force is suppressed by the terminal component 40 to which the eye component 72 is attached, by which the feed line 60A is not exposed to an unnecessary force and by which damage to the projecting tip of the outer lead 50A of the hermetically sealing part 33A is avoided.

Figure 5A:
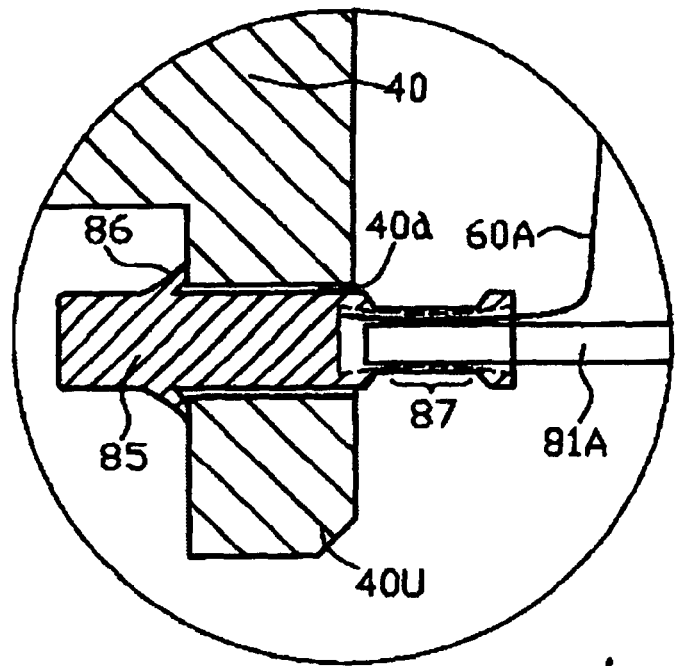
FIGS. 5(a) to 5(d) each show an enlargement of a respective example of a connecting part of the feed line.
Figure 5B:
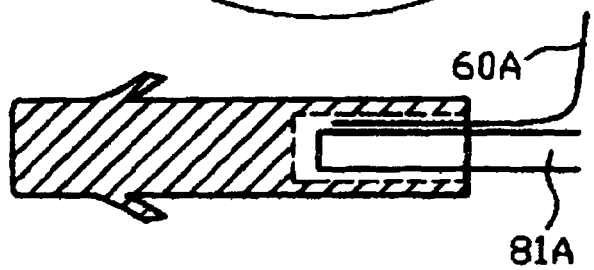
Figure 5C:
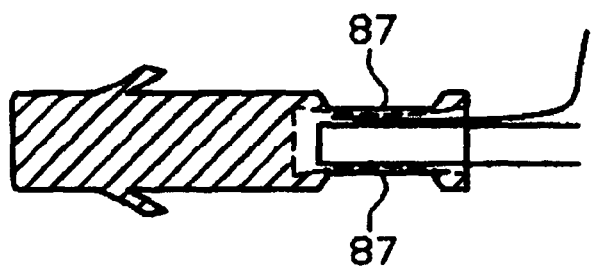
Figure 5D:
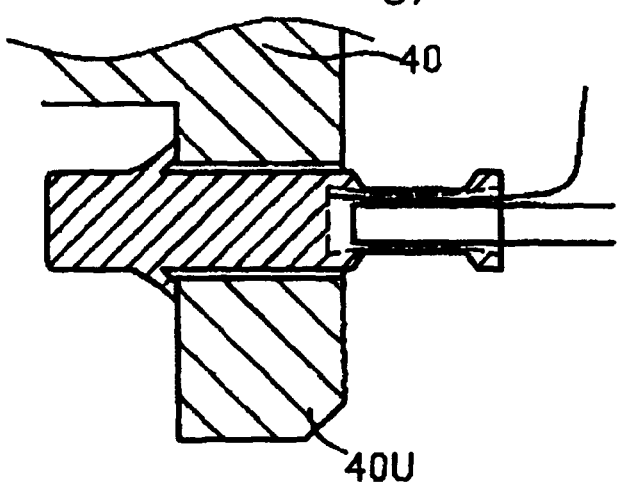
Figure 6:
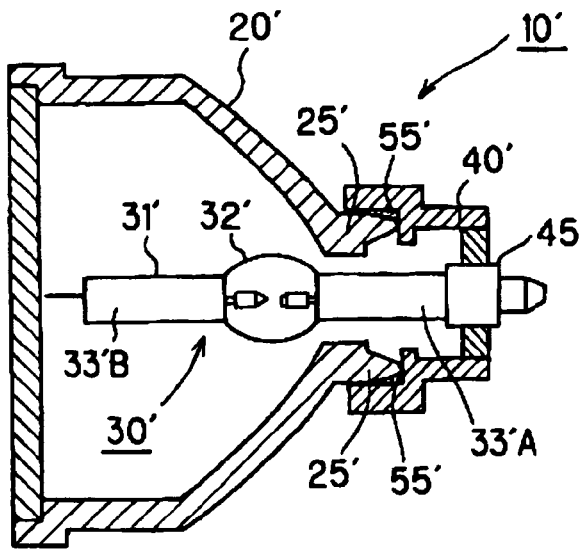
FIG. 6 is a cross-sectional view of the arrangement of a conventional light source unit and FIG. 7 is a cross-sectional view of the arrangement of another conventional light source unit.
Figure 7:
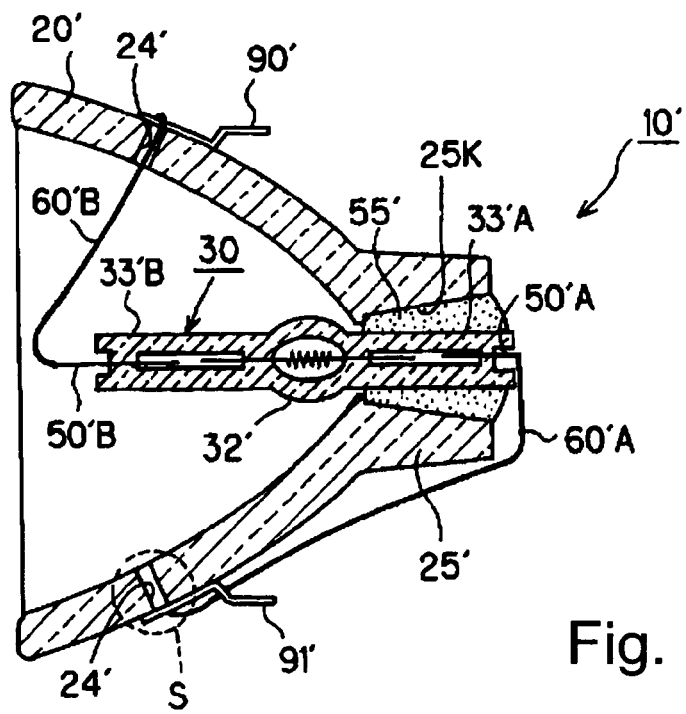

FIGS. 5(a) to 5(c) each show another method of attachment of the feed line 60A using the through opening 40a shown in FIG. 4. As shown in FIGS. 5(a) to 5(d), the feed line 60A and the terminal 81A are pushed into a metallic component 85 of copper alloy or the like, with a tip which is provided with a collar 86, and are attached by a seal, a weld 87 or the like. The metallic component 85, feed line 60A and the terminal 81A can also be inserted into the through opening 40a of the base component 40 as shown in FIG. 4 and attached using the collar 86. In FIGS. 5(b) to 5(d), the sequence of connecting the feed line 60A to the terminal 81A is shown. In this way, the number of contact components that must be arranged on the reflector surface can be reduced and the degree of light utilization can be increased. Furthermore, the electrical insulation area of the back of the reflector can be made smaller, and in the case of starting by application of a high voltage, the area which is required to ensure the creepage distance can be reduced, and thus, can contribute to making the device smaller. Additionally, the number of the holes that must be made in the reflector can be reduced, and thus, the effort required to arrange the contact components, and in this way, the production costs, can be decreased. If the coated electric line 81 is subjected to tension, the tensile force is suppressed by the terminal component 40, by which the feed line 60A is not exposed to an unnecessary force and by which damage to the projecting tip of the outer lead 50A of the hermetically sealing part 33A is avoided.

What is claimed is:

1. Light source unit, comprising:
    a concave reflector have a neck with an opening at an end thereof,
    a base component which is mounted over the end of the neck of the concave reflector, and
    a discharge lamp with a discharge vessel that contains a light-emitting part and that is sealed at each of opposite ends thereof by a respective hermetically sealing part and wherein a first of the hermetically sealing parts is directly cemented to the base component with a portion thereof protruding from an outer side of an outer end of the base component so as to be exposed outside of the reflector,
    wherein an outer lead of the lamp proceeds directly from the first hermetically sealing part and is connected to the base component externally thereof, and
    wherein a coated electric line is connected to the base component by one of a metallic component, a screw and an eye component.

2. Light source unit as claimed in claim 1, wherein the outer lead is directly connected to the base component.

3. Light source unit as claimed in claim 1, wherein the outer lead is connected to the base component via said electric line.

4. Light source unit as claimed in claim 3, wherein the electric line is attached to the base component by a mounting means which fits into a hole in the base component.

5. Light source unit as claimed in claim 2, wherein the outer lead is attached to the base component by a mounting means which fits into a hole in the base component.

6. Light source unit as claimed in claim 5, wherein the hole is a through hole in the base component, the hole being located in a projection of the base component, and the mounting means being a sleeve which is inserted into the hole.

7. Light source unit as claimed in claim 3, wherein the metal component is a metal sleeve and the electric line is clamped into the metal sleeve which is connected to the base component.

8. Light source unit as claimed in claim 2, wherein the outer lead is clamped into a metal sleeve which is connected to the base component.

9. Light source unit as claimed in claim 3, wherein the electric line is connected to a terminal component which is supported on the base component.

10. Light source unit as claimed in claim 2, wherein the outer lead is connected to a terminal component which is supported on the base component.

11. Light source unit, comprising:
    a concave reflector having a neck with an opening extending through the neck,
    a base component which is mounted on the neck of the concave reflector, and
    a discharge lamp having a discharge vessel with a light emitting part, the discharge vessel being sealed by a respective hermetically sealing part, one of the hermetically sealing parts being located at each of opposite ends of the light emitting part, and in which a first of the hermetically sealing parts is directly cemented to the base component with an outer end portion of the first hermetically sealing part protruding outwardly beyond an outer side of an outer end of the base component so as to be exposed outside of the reflector,
    wherein an outer lead of the lamp extends directly outward from the protruding outer end portion of the first hermetically sealing part at an outermost end of the light source to a connection with the base component externally thereof, and
    wherein a coated electric line is connected to the base component by one of a metallic component, a screw and an eye component.

12. Light source unit as claimed in claim 11, wherein the outer lead is connected to the base component via said electric line.

13. Light source unit as claimed in claim 11, wherein the outer lead and the coated electric line are connected to the base component at a side area of the base component, at a location axially forward of the outer end of the base component in a direction toward the reflector.

14. Light source unit as claimed in claim 1, wherein the outer lead and the coated electric line are connected to the base component at a side area of the base component at a location axially forward of the outer end of the base component in a direction toward the reflector.

* * * * *